US012594952B2

(12) United States Patent
Hirosawa et al.

(10) Patent No.: US 12,594,952 B2
(45) Date of Patent: Apr. 7, 2026

(54) CONTROL DEVICE FOR AUTO LANE CHANGING

(71) Applicant: HONDA MOTOR CO., LTD., Tokyo (JP)

(72) Inventors: Nozomu Hirosawa, Tokyo (JP); Tomotaka Teramachi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 18/665,590

(22) Filed: May 16, 2024

(65) Prior Publication Data

US 2024/0383494 A1    Nov. 21, 2024

(30) Foreign Application Priority Data

May 17, 2023    (JP) ................................. 2023-081649

(51) Int. Cl.
*B60W 50/14*        (2020.01)
*B60W 30/18*        (2012.01)
(52) U.S. Cl.
CPC ...... *B60W 50/14* (2013.01); *B60W 30/18163* (2013.01)
(58) Field of Classification Search
CPC ........................ B60W 50/14; B60W 30/18163
See application file for complete search history.

(56) References Cited

U.S. PATENT DOCUMENTS

| | | | | |
|---|---|---|---|---|
| 2018/0055438 | A1* | 3/2018 | Nakahata ............. | A61B 5/1128 |
| 2018/0148060 | A1* | 5/2018 | Hashimoto ..... | B60W 30/18163 |
| 2018/0236939 | A1* | 8/2018 | Smith ........................ | B60R 1/24 |
| 2018/0354517 | A1* | 12/2018 | Banno ................... | B60W 40/08 |
| 2019/0351918 | A1* | 11/2019 | Maeng ................... | H04W 4/023 |
| 2020/0255013 | A1* | 8/2020 | Lee ........................... | B60Q 1/50 |

(Continued)

FOREIGN PATENT DOCUMENTS

| | | |
|---|---|---|
| JP | 2002-117496 A | 4/2002 |
| JP | 2009-166588 A | 7/2009 |

(Continued)

OTHER PUBLICATIONS

Apr. 1, 2025, Translation of Japanese Office Action issued for related JP Application No. 2023-081649.

*Primary Examiner* — Ramon A. Mercado
(74) *Attorney, Agent, or Firm* — Paratus Law Group, PLLC

(57)            ABSTRACT

A control device includes: a recognition unit configured to recognize at a surrounding situation of a moving object; a lane change determination unit configured to determine, based on the surrounding situation, whether lane change control is executable; a travel control unit configured to execute the lane change control in response to determination that the lane change control is executable; and a notification control unit configured to issue predetermined notification to an occupant of the moving object. The notification control unit issues, to the occupant of the moving object, notification that the lane change control is to be started in response to the determination. The travel control unit starts the lane change control after a predetermined time elapses from when the notification is started. The predetermined time differs depending on a lane change direction of the moving object under the lane change control.

9 Claims, 9 Drawing Sheets

(56)    References Cited

U.S. PATENT DOCUMENTS

2022/0185334 A1*    6/2022    Bae ..................... G08G 1/0145
2022/0212689 A1     7/2022    Nakao et al.

FOREIGN PATENT DOCUMENTS

| JP | 2014-072604 | A | 4/2014 |
| JP | 5825239 | B2 | 12/2015 |
| JP | 2017-102519 | A | 6/2017 |
| JP | 2018-086966 | A | 6/2018 |
| JP | 6576492 | B2 | 9/2019 |
| WO | WO 2020/230613 | A1 | 11/2020 |

* cited by examiner

LANE CHANGE TO DRIVER SEAT SIDE

LANE CHANGE TO PASSENGER SEAT SIDE (CONT.)

(FIG. 5 CONTINUED)

START TO TURN ON BLINKER ⎯ S26

OCCUPANT
CAN CONFIRM SURROUNDINGS WITHIN
SURROUNDING CONFIRMATION
TIME?  S28

NO

YES

A

TURN OFF BLINKER ⎯ S29

SET LANE CHANGE
FLAG TO BE OFF ⎯ S30

END

CONTROL DEVICE FOR AUTO LANE CHANGING

This application is based upon and claims the benefit of priority from prior Japanese patent application No. 2023-81649, filed on May 17, 2023, the entire contents of which are incorporated herein by reference.

TECHNICAL FIELD

The present disclosure relates to a control device configured to execute lane change control of changing a lane in which a moving object travels.

BACKGROUND ART

In recent years, active efforts have been made to provide access to a sustainable transportation system in consideration of vulnerable people among traffic participants. For implementing the above object, research and development for further improving traffic safety and convenience through research and development related to driving assistance technology and automatic-driving technology have been focused on. As an example of the driving assistance technology or the automatic-driving technology, JP6576492B and JP5825239B disclose auto lane change (ALC) technology for partially or completely automatically controlling a lane change of a vehicle.

In the auto lane change technology, a time (hereinafter, also referred to as a surrounding confirmation time) for a driver to confirm surroundings of the vehicle may be set in consideration of safety before performing the lane change. An automatic-driving system described in JP6576492B performs control to delay an actual start timing of the lane change from a reference timing according to a driving environment of the vehicle, and the driver can confirm the surroundings of the vehicle during the delay time.

SUMMARY

In the auto lane change technology in the related art, depending on a direction of the lane change, the driver may not be able to sufficiently confirm the surroundings of the vehicle within the surrounding confirmation time. It is considered that the surrounding confirmation time is uniformly lengthened in order to ensure that the driver can sufficiently confirm the surroundings of the vehicle regardless of the direction of the lane change. In this case, an execution opportunity of the lane change decreases.

Aspects of the present disclosure relates to providing a control device capable of sufficiently ensuring a surrounding confirmation time in any direction of a lane change and preventing a decrease in an execution opportunity of the lane change.

According to an aspect of the present disclosure, there is provided a control device configured to execute lane change control of changing a lane in which a moving object travels, the control device including:

a recognition unit configured to recognize at a surrounding situation of the moving object;

a lane change determination unit configured to determine, based on the surrounding situation recognized by the recognition unit, whether the lane change control is executable;

a travel control unit configured to execute the lane change control in response to the lane change determination unit determining that the lane change control is executable; and a notification control unit configured to issue predetermined notification to an occupant of the moving object via a notification device mounted on the moving object, in which the notification control unit issues, to the occupant of the moving object, notification that the lane change control is to be started in response to the lane change determination unit determining that the lane change control is executable, the travel control unit starts the lane change control after a predetermined time elapses from when the notification control unit starts the notification that the lane change control is to be started, and the predetermined time differs depending on a lane change direction of the moving object under the lane change control.

According to an aspect of the present disclosure, the surrounding confirmation time may be sufficiently ensured in any direction of the lane change and the decrease in an execution opportunity of the lane change may be prevented. This may contribute to development of a sustainable transportation system.

BRIEF DESCRIPTION OF DRAWINGS

Exemplary embodiment(s) of the present invention will be described in detail based on the following figures, wherein:

FIG. 4A shows a case of the lane change of the vehicle 1 to a driver seat side, and FIG. 4B shows a case of the lane change of the vehicle 1 to a passenger seat side;

DESCRIPTION OF EMBODIMENTS

Hereinafter, a control device for a moving object according to an embodiment of the present disclosure will be described with reference to the accompanying drawings. In the present embodiment, the moving object is described as a four-wheel vehicle, but may be a vehicle such as a three-wheeled vehicle.

Vehicle

Figure 1:
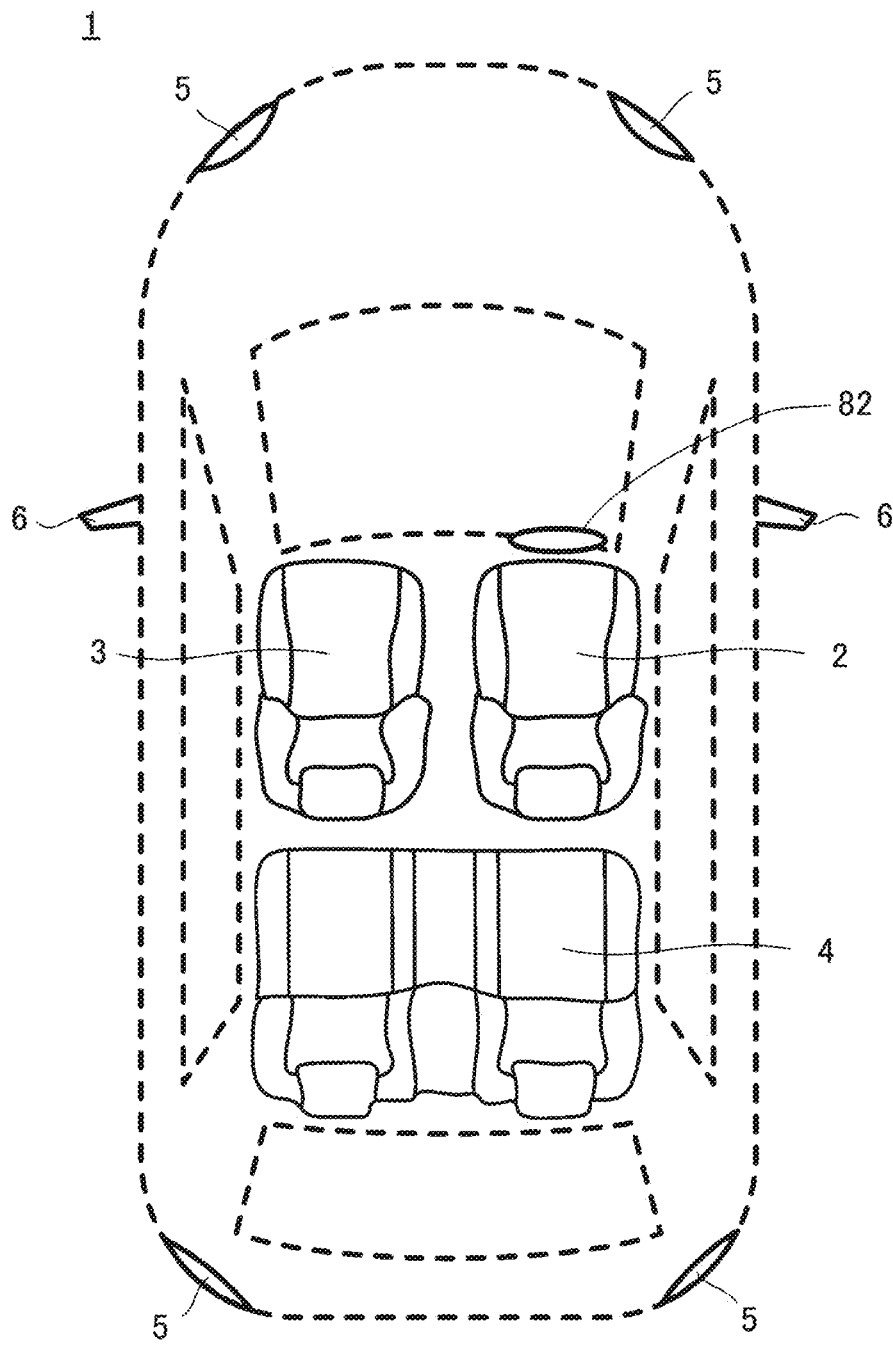
FIG. 1 is a schematic diagram of a vehicle 1 according to an embodiment of a moving object.

FIG. 1 is a schematic diagram of a vehicle 1 according to an embodiment of the moving object. The vehicle 1 is, for example, a right-hand drive vehicle, that is, a driver seat 2 in front of which a steering wheel 82 is provided is disposed on a right side. In the vehicle 1, a passenger seat 3 is disposed on an opposite side (that is, a left side) of the driver seat 2 in a left-right direction, and a rear seat 4 is disposed behind the driver seat 2 and the passenger seat 3.

The vehicle 1 may be a left-hand drive vehicle, that is, the driver seat 2 may be disposed on the left side and the passenger seat 3 may be disposed on the right side.

In the vehicle 1, blinkers 5 are provided on a left side (for example, a left front side and a left rear side) and a right side (for example, a right front side and a right rear side), respectively. The blinkers 5 are provided at positions visible from the outside of the vehicle 1.

A pair of left and right side mirrors 6 are provided on lateral sides of the vehicle 1. The side mirror 6 is provided at a position where an occupant (in particular, a driver) of the vehicle 1 may visually recognize the rear and lateral sides of the vehicle 1. For example, an angle of the side mirror 6 may be adjusted by the occupant operating an operation unit (not shown).

Overall Configuration of Vehicle System

Figure 2:
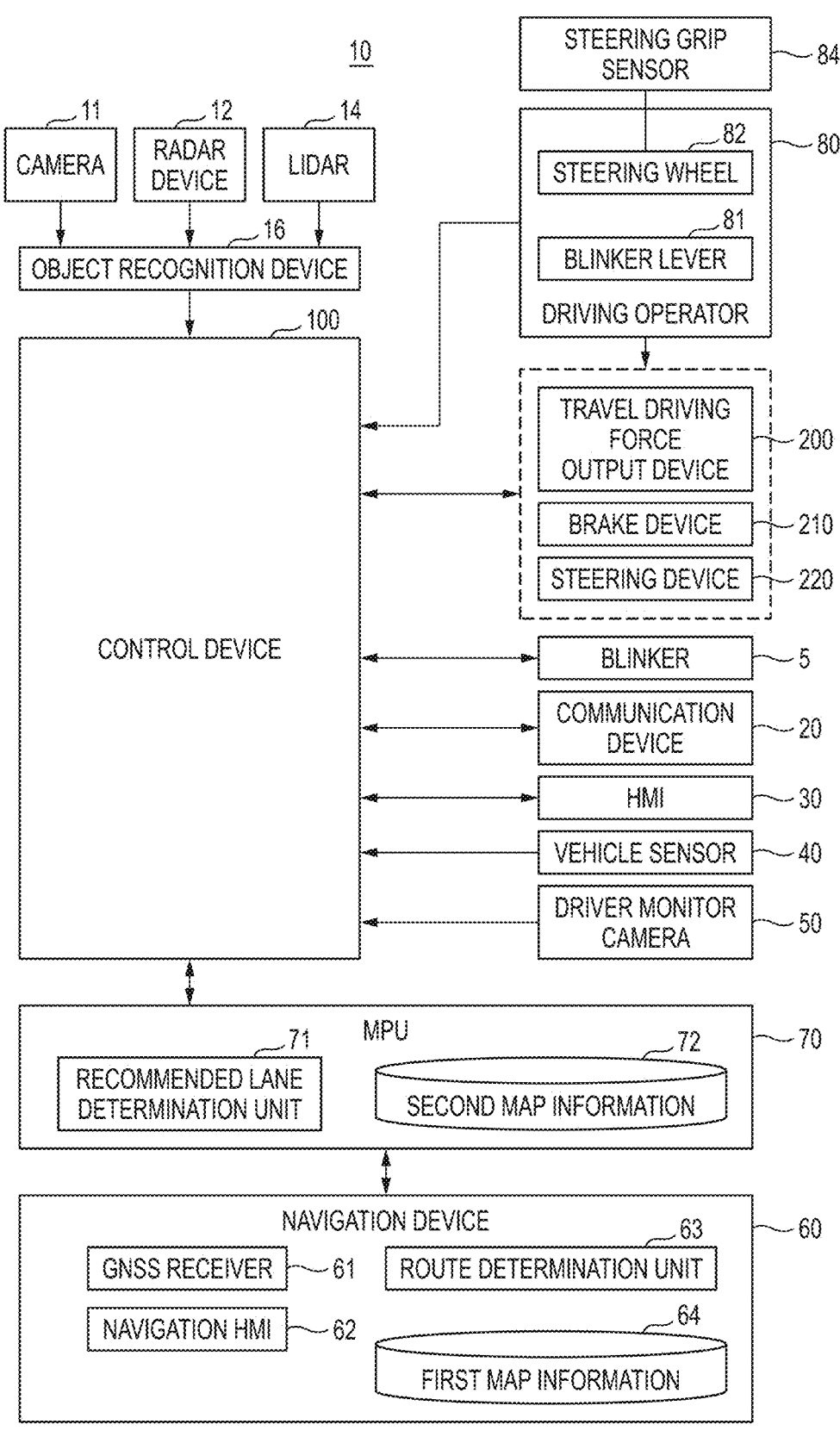
FIG. 2 is a block diagram showing an overall configuration of a vehicle system 10 mounted on the vehicle 1.

FIG. 2 is a block diagram showing an overall configuration of a vehicle system 10 mounted on the vehicle 1.

The vehicle system 10 includes, for example, a camera 11, a radar device 12, a light detection and ranging (LIDAR) 14, an object recognition device 16, a communication device 20, a human machine interface (HMI) 30, a vehicle sensor 40, a driver monitor camera 50, a navigation device 60, a map positioning unit (MPU) 70, a driving operator 80, a control device 100, a travel driving force output device 200, a brake device 210, and a steering device 220. These devices are connected to each other by a multiplex communication line such as a controller area network (CAN) communication line, a serial communication line, or a wireless communication network.

The camera 11 is, for example, a digital camera using an imaging device such as a charge coupled device (CCD) or a complementary metal oxide semiconductor (CMOS). The camera 11 is attached at any postilion on the vehicle 1.

The radar device 12 emits radio waves such as millimeter waves to surroundings of the vehicle 1, and detects radio waves (reflected waves) reflected by an object to detect at least a position (distance and orientation) of the object. The radar device 12 is attached at any position on the vehicle 1.

The LIDAR 14 emits light (or an electromagnetic wave having a wavelength close to that of light) around the vehicle 1 and measures scattered light. The LIDAR 14 detects a distance to a target based on a time elapsed from light emission to light reception. The emitted light is, for example, pulsed laser light. The LIDAR 14 is attached at any postilion on the vehicle 1.

The object recognition device 16 performs sensor fusion processing on some or all of detection results of the camera 11, the radar device 12, and the LIDAR 14 to recognize a position, a type, a speed, and the like of an object. The object recognition device 16 outputs a recognition result to the control device 100. The object recognition device 16 may output the detection results of the camera 11, the radar device 12, and the LIDAR 14 to the control device 100 as they are.

The communication device 20 uses, for example, a cellular network, a Wi-Fi (registered trademark) network, Bluetooth (registered trademark), or dedicated short range communication (DSRC) to communicate with other vehicles present in the surroundings of the vehicle 1 or communicate with various server devices via a radio base station.

The HMI 30 presents various types of information to the occupant of the vehicle 1 and receives an input operation from the occupant. The HMI 30 includes various types of display devices, a speaker, a buzzer, a touch panel, a switch, keys, and the like.

The vehicle sensor 40 includes a speed sensor that detects a travel speed (hereinafter also referred to as a "speed") of the vehicle 1, an acceleration sensor that detects an acceleration, a yaw rate sensor that detects an angular speed around a vertical axis, an azimuth sensor that detects a direction of the vehicle 1, and the like.

The driver monitor camera 50 is, for example, a digital camera using a solid-state imaging device such as a CCD or a CMOS. The driver monitor camera 50 is attached at any position on the vehicle 1 in a position and an orientation in which the head of the occupant (hereinafter, also referred to as a "driver") seated in the driver seat of the vehicle 1 is able to be imaged from the front (that is, in an orientation in which the face is imaged). The driver monitor camera 50 may be attached to be capable of imaging an occupant of the vehicle 1 on a seat other than the driver seat in addition to the driver.

The navigation device 60 includes, for example, a global navigation satellite system (GNSS) receiver 61, a navigation HMI 62, and a route determination unit 63. The navigation device 60 stores first map information 64 in a storage device such as a hard disk drive (HDD) or a flash memory. 20

The GNSS receiver 61 specifies a position of the vehicle 1 based on a signal received from a GNSS satellite. The position of the vehicle 1 may be specified or complemented by an inertial navigation system (INS) using an output of the vehicle sensor 40.

The navigation HMI 62 includes a display device, a speaker, a touch panel, a key, and the like. The navigation HMI 62 may be made common to the HMI 30 partially or entirely.

For example, with reference to the first map information 64, the route determination unit 63 determines a route (hereinafter, also referred to as an "on-map route") from the position of the vehicle 1 specified by the GNSS receiver 61 (or any input position) to a destination input by the occupant using the navigation HMI 62. The first map information 64 is, for example, information in which a road shape is expressed by a link indicating a road and nodes connected by the link. The first map information 64 may include a curvature of a road, point of interest (POI) information, and the like. The on-map route is output to the MPU 70.

The navigation device 60 may perform route guidance using the navigation HMI 62 based on the on-map route. The navigation device 60 may transmit a current position and the destination to a navigation server via the communication device 20 and acquire a route equivalent to the on-map route from the navigation server.

The MPU 70 includes, for example, a recommended lane determination unit 71, and stores second map information 72 in a storage device such as an HDD or a flash memory. The recommended lane determination unit 71 divides the on-map route provided from the navigation device 60 into a plurality of blocks (for example, divides the on-map route by 100 [m] in a vehicle traveling direction), and determines a recommended lane for each block with reference to the second map information 72. For example, the recommended lane determination unit 71 determines which lane from the left is to travel in. When a branching point is present in the on-map route, the recommended lane determination unit 71 determines a recommended lane such that the vehicle 1 may travel along a reasonable route for advancing to a branch destination.

The second map information 72 is map information with higher accuracy than the first map information 64. The second map information 72 includes, for example, information on a center of a lane or information on a boundary of the lane. The second map information 72 may include road information, traffic regulation information, address information, facility information, telephone number information, and the like. The second map information 72 may be updated, as required, by the communication device 20 communicating with another device.

The driving operator 80 includes, for example, an accelerator pedal, a brake pedal, a shift lever, and other operators in addition to a blinker lever 81 and the steering wheel 82. A sensor configured to detect an operation amount or presence or absence of an operation is attached to the driving operator 80, and a detection result thereof is output to some or all of the control device 100, the travel driving force output device 200, the brake device 210, and the steering device 220.

The blinker lever 81 is an operator for turning on (including blinking) or turning off the blinker 5. The control device 100 turns on or off the blinker 5 according to an operation on the blinker lever 81.

The steering wheel 82 is an operator for receiving a steering operation. The steering wheel 82 is not necessarily in an annular shape, and may be in a form of irregular steering, joy stick, button, or the like. A steering grip sensor 84 is attached to the steering wheel 82. The steering grip sensor 84 is implemented by a static capacitance sensor or the like, and outputs, to the control device 100, a signal capable of detecting whether the driver is gripping the steering wheel 82.

The control device 100 is a computer centrally controls the entire vehicle 1, and is implemented by, for example, a hardware processor such as a central processing unit (CPU) executing a program (software). Some or all of these components may be implemented by hardware (including circuitry) such as a large scale integration (LSI), an application specific integrated circuit (ASIC), a field-programmable gate array (FPGA), and a graphics processing unit (GPU), or may be implemented by cooperation of software and hardware. The program may be stored in advance in a storage device such as an HDD or a flash memory of the control device 100. Details of the control device 100 will be described later.

The travel driving force output device 200 outputs, to driving wheels, a travel driving force (torque) for driving the vehicle to travel. The travel driving force output device 200 includes, for example, a combination of an internal combustion engine, an electric motor, a transmission, and the like, and an electronic control unit (ECU) configured to control the combination. The ECU controls the above-described configuration according to information received from the control device 100 or information received from the driving operator 80.

The brake device 210 includes, for example, a brake caliper, a cylinder configured to transmit hydraulic pressure to the brake caliper, an electric motor configured to generate hydraulic pressure in the cylinder, and a brake ECU. The brake ECU controls the electric motor according to the information received from the control device 100 or the information received from the driving operator 80, and outputs a braking torque to each wheel in response to a braking operation.

The steering device 220 includes, for example, a steering ECU and an electric motor. The electric motor changes an orientation of driven wheels, for example, by applying a force to a rack-and-pinion mechanism. The steering ECU drives the electric motor according to the information received from the control device 100 or the information received from the driving operator 80 to change the orientation of the driven wheels.

Control Device

Figure 3:
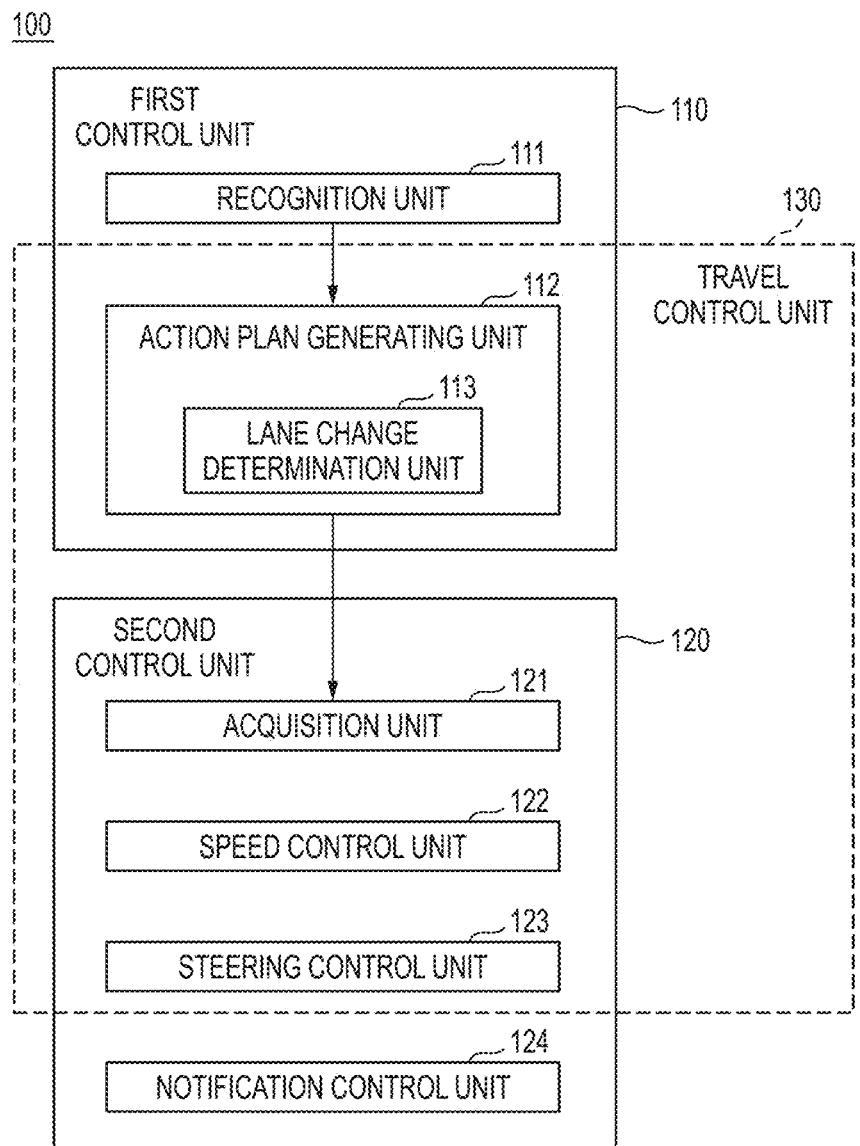
FIG. 3 is a diagram showing an example of a configuration of a control device 100.

FIG. 3 is a diagram showing an example of a configuration of the control device 100. The control device 100 includes, for example, a first control unit 110 and a second control unit 120.

The first control unit 110 includes, for example, a recognition unit 111 and an action plan generating unit 112. The first control unit 110 implements, for example, a function based on artificial intelligence (AI) and a function based on a model given in advance in parallel.

The recognition unit 111 recognizes a surrounding situation of the vehicle 1 based on information received from the camera 11, the radar device 12, and the LIDAR 14 via the object recognition device 16. Specifically, the recognition unit 111 recognizes a position of an object (including other vehicles M1, M2 to be described later) around the vehicle 1, and a traveling state including a speed, an acceleration, and the like of the object.

For example, the position of the object is recognized as a position on absolute coordinates with a representative point (a center of gravity, a drive shaft center, or the like) of the vehicle 1 as an origin, and is used for control. The position of the object may be represented by a representative point such as a center of gravity or a corner of the object, or may be represented by a region.

A "state" of the object may include an acceleration or jerk of the object, or an "action state" (for example, whether the object is changing a lane, or whether the object is about to change the lane).

For example, the recognition unit 111 recognizes a travel environment in which the vehicle 1 is traveling. For example, the recognition unit 111 recognizes a travel lane of the vehicle 1 by comparing a pattern of road division lines (for example, an array of solid lines and broken lines) obtained from the second map information 72 with a pattern of road division lines around the vehicle 1 recognized from an image captured by the camera 11. The recognition unit 111 may recognize the travel lane by recognizing not only the road division lines but also a course boundary (road boundary) including a road division line, a road shoulder, a curbstone, a median strip, a guard rail, and the like. In the recognition, the position of the vehicle 1 acquired from the navigation device 60 or a processing result of the INS may be added. Further, the recognition unit 111 may recognize a temporary stop line, an obstacle, a red signal, a tollgate, and other road events.

When recognizing the travel lane, the recognition unit 111 recognizes a position and a posture of the vehicle 1 with respect to the travel lane. For example, the recognition unit 111 may recognize a deviation of a reference point of the vehicle 1 from a lane center and an angle of a traveling direction of the vehicle 1 with respect to a line connecting lane centers, as a relative position and a posture of the vehicle 1 with respect to the travel lane. Alternatively, the recognition unit 111 may recognize a position of the reference point of the vehicle 1 with respect to any side end portion (road division line or road boundary) of the travel lane as the relative position of the vehicle 1 with respect to the travel lane.

The action plan generating unit 112 generates a target trajectory for the vehicle 1 to automatically (that is, not based on an operation of the driver) travel in the future such that the vehicle 1 travels in principle in the recommended lane determined by the recommended lane determination unit 71, and responds to the surrounding situation of the vehicle 1.

The target trajectory includes, for example, a speed element. For example, the target trajectory is represented by arranging points (trajectory points) to be reached by the vehicle 1 in order. The trajectory point is a point to be reached by the vehicle 1 for each predetermined travel distance (for example, about several meters) along a road, and separately, a target speed and a target acceleration for each predetermined sampling time (for example, about a few fractions of a second) are generated as a part of the target trajectory. Further, the trajectory point may be a position to be reached by the vehicle 1 at a sampling time point within each predetermined sampling time. In this case, information on the target speed and the target acceleration is expressed by an interval of the trajectory points.

The action plan generating unit 112 may set an event of automatic-driving when generating the target trajectory. The event of the automatic-driving includes a constant speed traveling event, a low speed following traveling event, a lane change event, a branching event, a merging event, a take over event, and the like. The action plan generating unit 112 generates the target trajectory according to an activated event.

For example, the action plan generating unit 112 includes a lane change determination unit 113 as a function of setting a lane change event.

The lane change determination unit 113 determines whether the lane change control is executable based on the travel environment of the vehicle 1 recognized by the recognition unit 111. The lane change determination unit 113 determines whether the lane change control is executable based on the travel environment of the vehicle 1, for example, regardless of an operation (for example, an operation on the blinker lever 81) of the driver seated in the driver seat 2.

For example, when an inter-vehicle distance between the vehicle 1 and another vehicle (also referred to as a preceding vehicle) traveling in front of the vehicle 1 in the travel lane is equal to or less than a predetermined threshold value, the lane change determination unit 113 determines whether to perform the lane change to be described later. Further, when another vehicle traveling in an adjacent lane adjacent to the travel lane of the vehicle 1 is detected, the lane change determination unit 113 determines whether the lane change control to be described later is executable based on, for example, a relative speed and the inter-vehicle distance between the vehicle 1 and the other vehicle that has been detected.

When the lane change determination unit 113 determines that the lane change control is executable, the action plan generating unit 112 sets a lane change event and generates a target trajectory corresponding to the lane change event.

The second control unit 120 controls the vehicle 1 to pass through, at a scheduled time, the target trajectory generated by the action plan generating unit 112. The second control unit 120 includes, for example, an acquisition unit 121, a speed control unit 122, a steering control unit 123, and a notification control unit 124.

The acquisition unit 121 acquires information on the target trajectory (trajectory points) generated by the action plan generating unit 112 and stores the information in a memory (not shown).

The speed control unit 122 controls the travel driving force output device 200 or the brake device 210 based on the speed element accompanying the target trajectory stored in the memory.

The steering control unit 123 controls the steering device 220 according to a degree of curvature of the target trajectory stored in the memory.

The processing of the speed control unit 122 and the steering control unit 123 is implemented by, for example, a combination of feedforward control and feedback control.

The notification control unit 124 controls the HMI 30, the navigation HMI 62, and the like to issue various notifications (presentation of various information) to an occupant (for example, a driver) of the vehicle 1. For example, the notification control unit 124 notifies the occupant of a start of the lane change control, or, when the lane change control is cancelled midway, notifies the occupant of the cancelling. The start notification of the lane change control or the notification of cancelling the lane change control is issued, for example, by displaying on a display device such as the HMI 30 or the navigation HMI 62 or by outputting a sound from a speaker.

In the control device 100, for example, a combination of the action plan generating unit 112 of the first control unit 110 and the acquisition unit 121, the speed control unit 122, and the steering control unit 123 of the second control unit 120 constitutes a travel control unit 130. For example, when the lane change determination unit 113 determines that the lane change control is executable, the travel control unit 130 executes the lane change control.

Lane Change Control

Operation of Lane Change

Figures 4A, 4B:
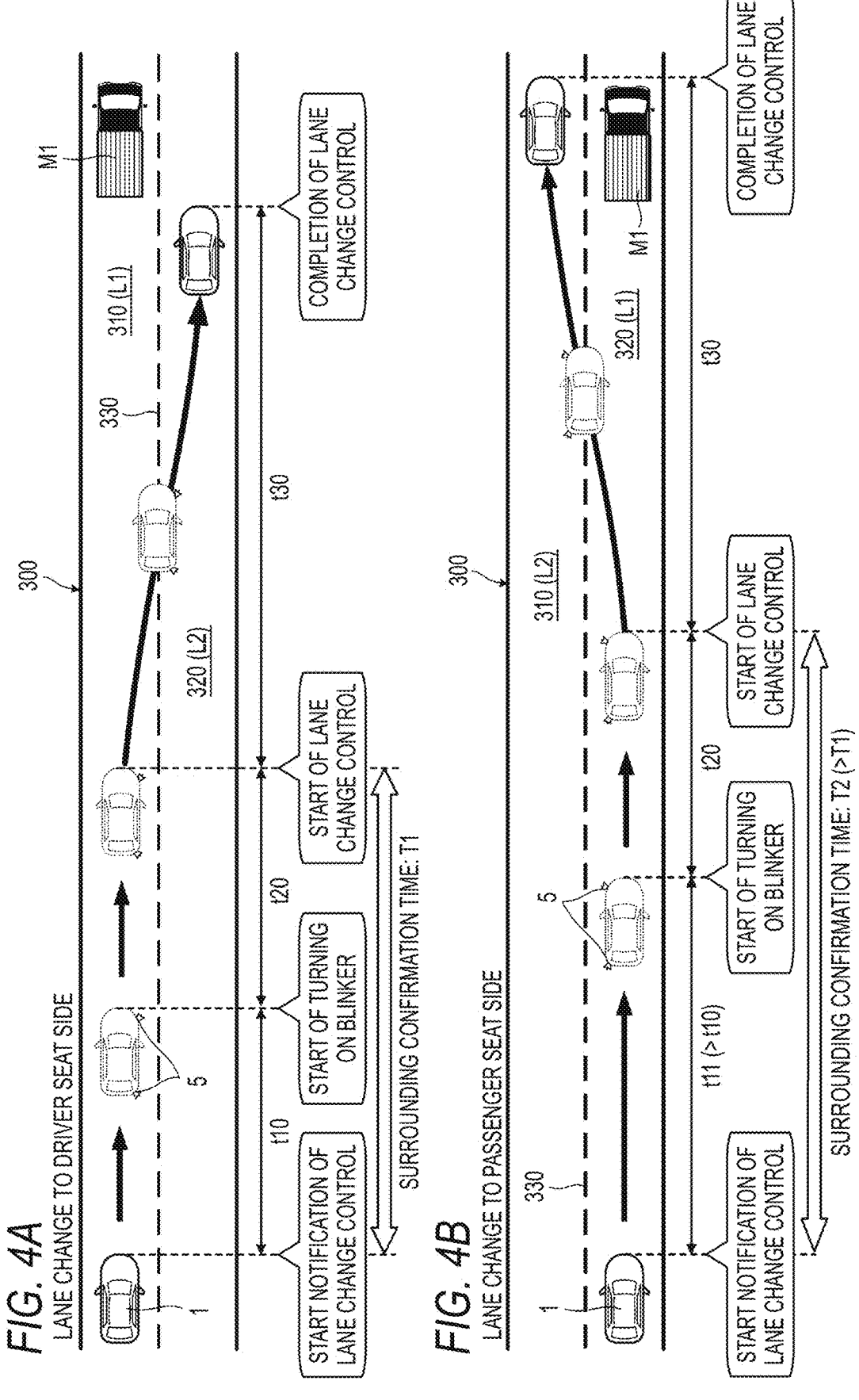
FIG. 4A and FIG. 4B are diagrams showing examples of an operation of a lane change of the vehicle 1 under lane change control.

FIGS. 4A and 4B show an example of an operation of the lane change of the vehicle 1 under the lane change control. FIG. 4A shows a case of the lane change of the vehicle 1 to a driver seat side, and FIG. 4B shows a case of the lane change of the vehicle 1 to a passenger seat side.

Here, a case will be described as an example in which the vehicle 1 autonomously travels under the control of the control device 100 regardless of an operation of the driver seated in the driver seat 2. At this time, according to the surrounding situation of the vehicle 1 or the like recognized by the recognition unit 111, the control device 100 may appropriately execute the lane change control of changing the lane in which the vehicle 1 travels.

A road 300 includes a left lane 310, a right lane 320, and a division line 330 provided at a boundary between the left lane 310 and the right lane 320 and serving as a road division line. Traveling directions of the left lane 310 and the right lane 320 are directions from the left to the right in FIGS. 4A and 4B.

Hereinafter, the travel lane of the vehicle 1 is also referred to as an "own lane L1". Hereinafter, a lane adjacent to the own lane L1 is also referred to as an "adjacent lane L2". In FIG. 4A, the vehicle 1 is traveling in the left lane 310, the own lane L1 is the left lane 310, and the adjacent lane L2 is the right lane 320. Meanwhile, in FIG. 4B, the vehicle 1 is traveling in the right lane 320, the own lane L1 is the right lane 320, and the adjacent lane L2 is the left lane 310.

First, FIG. 4A will be described. While the vehicle 1 is traveling in the left lane 310 of the road 300, the control device 100 executes lane change control in order to overtake the preceding vehicle M1 traveling in the own lane L1 at a slower speed than the vehicle 1.

Specifically, the lane change determination unit 113 determines whether the lane change control is executable based on the surrounding situation recognized by the recognition unit 111.

When the lane change determination unit 113 determines that the lane change control is executable, the notification control unit 124 notifies, via the HMI 30, the occupant of the vehicle 1 that the lane change control is to be started. The notification that the lane change control is started (hereinafter, also referred to as a start notification of the lane change control) is, for example, display using a display device attached to the vehicle 1 or a notification issued by sound guidance from a speaker. At the time of the start notification of the lane change control, the notification control unit 124 may notify that the lane is changed to a direction of the lane change, here, a direction on the driver seat side is executed.

In addition to the start notification of the lane change control, the notification control unit 124 issues a notification for promoting the driver to confirm the surroundings of the vehicle 1. The driver confirms the surroundings of the vehicle 1 on the driver seat side. Specifically, the driver confirms the side mirror 6 on the driver seat side or directly confirms the lateral side (right side) of the vehicle 1 on the driver seat side.

After a time t10 has elapsed from the start of the notification (that is, the start notification of the lane change control) issued by the notification control unit 124, the control device 100 starts to turn on the blinker 5 on the right side. Accordingly, the lane change of the vehicle 1 is notified to the outside of the vehicle 1.

After a time t20 has elapsed from the start of turning on the blinker 5, the travel control unit 130 starts the lane change control to the driver seat side (right side). Accordingly, the travel control unit 130 starts steering the vehicle 1, and the vehicle 1 moves laterally.

The travel control unit 130 performs steering control to complete the lateral movement to the adjacent lane L2 after a time t30 has elapsed from the start of the lane change control. Thus, the lane change control is completed.

The above-described times t10, t20, and t30 are, for example, times stored in advance in the control device 100 by a manufacturer of the vehicle 1 or the like.

Here, a time from the start of the notification issued by the notification control unit 124 to the start of the lane change control corresponds to a surrounding confirmation time for the driver to confirm the surroundings of the vehicle 1. The surrounding confirmation time in a case of the lane change to the driver seat side (hereinafter, also simply referred to as a driver-seat-side surrounding confirmation time) is stored in the control device 100 in advance as a total time T1 of the time t10 and the time t20.

When the driver monitor camera 50 and/or the steering grip sensor 84 detects that the driver can confirm the surroundings within the surrounding confirmation time, the lane change control is started after the time t20 has elapsed from the start of turning on the blinker 5 as described above. Meanwhile, when it is not detected that the driver can confirm the surroundings within the surrounding confirmation time, the blinker 5 is turned off and the lane change control is not executed. For example, the lane change control may be started based on the fact that the driver monitor camera 50 or the like detects that the driver has confirmed the surroundings within the surrounding confirmation time.

As an example, when the time t10 from the start of the notification issued by the notification control unit 124 to the start of turning on the blinker 5 is set to 1 second, the time t20 from the start of turning on the blinker 5 to the start of the lane change control is set to 1 second, and the time t30 from the start of the lane change control to the completion of the lane change control is set to 6 seconds, a lane change time in the case of the lane change to the driver seat side as shown in FIG. 4A is 8 seconds which is a total time of the times t10, t20, and t30. The driver-seat-side surrounding confirmation time is 2 seconds, which is a total time T1 of the time t10 and the time t20.

Next, FIG. 4B will be described.

As in the case of the lane change to the driver seat side described above, in the case of the lane change to the passenger seat side, the notification control unit 124 also notifies, via the HMI 30, the occupant of the vehicle 1 that the lane change control is to be started, when the lane change determination unit 113 determines that the lane change control is executable. In addition to the start notification of the lane change control, the notification control unit 124 issues a notification for promoting the driver to confirm the surroundings of the vehicle 1.

Here, the side mirror 6 on the passenger seat side and the lateral side (left side) of the vehicle 1 are located farther from the driver seat than the side mirror 6 on the driver seat side and the lateral side (right side) of the vehicle 1. Therefore, the surroundings of the vehicle 1 on the passenger seat side is poor in visibility for the driver as compared with the surroundings of the vehicle 1 on the driver seat side.

In this way, the visibility of the surroundings on the passenger seat side generally deteriorates in a case of performing the lane change to the passenger seat side, and thus it takes more time for the driver to confirm the surroundings on the passenger seat side as compared with a case of performing the lane change to the driver seat side. Therefore, when the surrounding confirmation time in the case of the lane change to the passenger seat side (hereinafter, also simply referred to as a passenger-seat-side surrounding confirmation time) is set to T1 which is the same as the driver-seat-side surrounding confirmation time, there is a concern that the confirmation of the driver for the surroundings is insufficient.

Therefore, in the present embodiment, the surrounding confirmation time varies depending on the direction of the lane change of the vehicle 1 under the lane change control. Accordingly, even in the case of the lane change to the passenger seat side with poor visibility, the surrounding confirmation time may be sufficiently ensured.

Specifically, in the case of the lane change to the passenger seat side, a time from the start of the notification issued by the notification control unit 124 to the start of turning on the blinker 5 is a time t11 longer than the time t10 in the case of the lane change to the driver seat side. The time t11 is, for example, a time stored in advance in the control device 100 by a manufacturer or the like of the vehicle 1. Further, a time from the start of turning on the blinker 5 to the start of the lane change control is the time t20 as in the case of the lane change to the driver seat side.

The passenger-seat-side surrounding confirmation time is a total time T2 (>T1) of the times t11 and t20, that is, the passenger-seat-side surrounding confirmation time is longer than the driver-seat-side surrounding confirmation time. In other words, a start timing of the lane change control on the passenger seat side is delayed from a start timing of the lane change control on the driver seat side.

Like the driver-seat-side surrounding confirmation time, the passenger-seat-side surrounding confirmation time is stored in the control device 100 in advance as the total time T2 which is a total time of the time t11 and the time t20.

As an example, when the time t11 from the start of the notification issued by the notification control unit 124 to the start of turning on the blinker 5 is set to 2 seconds, the time t20 from the start of turning on the blinker 5 to the start of steering is set to 1 second, and the time t30 from the start of the lane change control to the completion of the lane change control is set to 6 seconds, a lane change time in the case of the lane change to the passenger seat side as shown in FIG. 4B is 9 seconds which is a total time of the times t11, t20, and t30. The passenger-seat-side surrounding confirmation time is 3 seconds, which is the total time T2 of the times t11 and t20.

When the surrounding confirmation time is uniformly increased regardless of the direction of the lane change (for example, when the driver-seat-side surrounding confirmation time is also T2), the lane change time in the case of the lane change to the driver seat side is also increased. When the lane change time increases, an opportunity of determining that the lane change control is not executable increases, and an execution opportunity of the lane change decreases.

In the present embodiment, since the surrounding confirmation time varies depending on the direction of the lane change of the vehicle 1, and the execution opportunity of the lane change increases as compared with the case where the surrounding confirmation time is uniformly increased regardless of the direction of the lane change.

Control Flow

Figure 5:
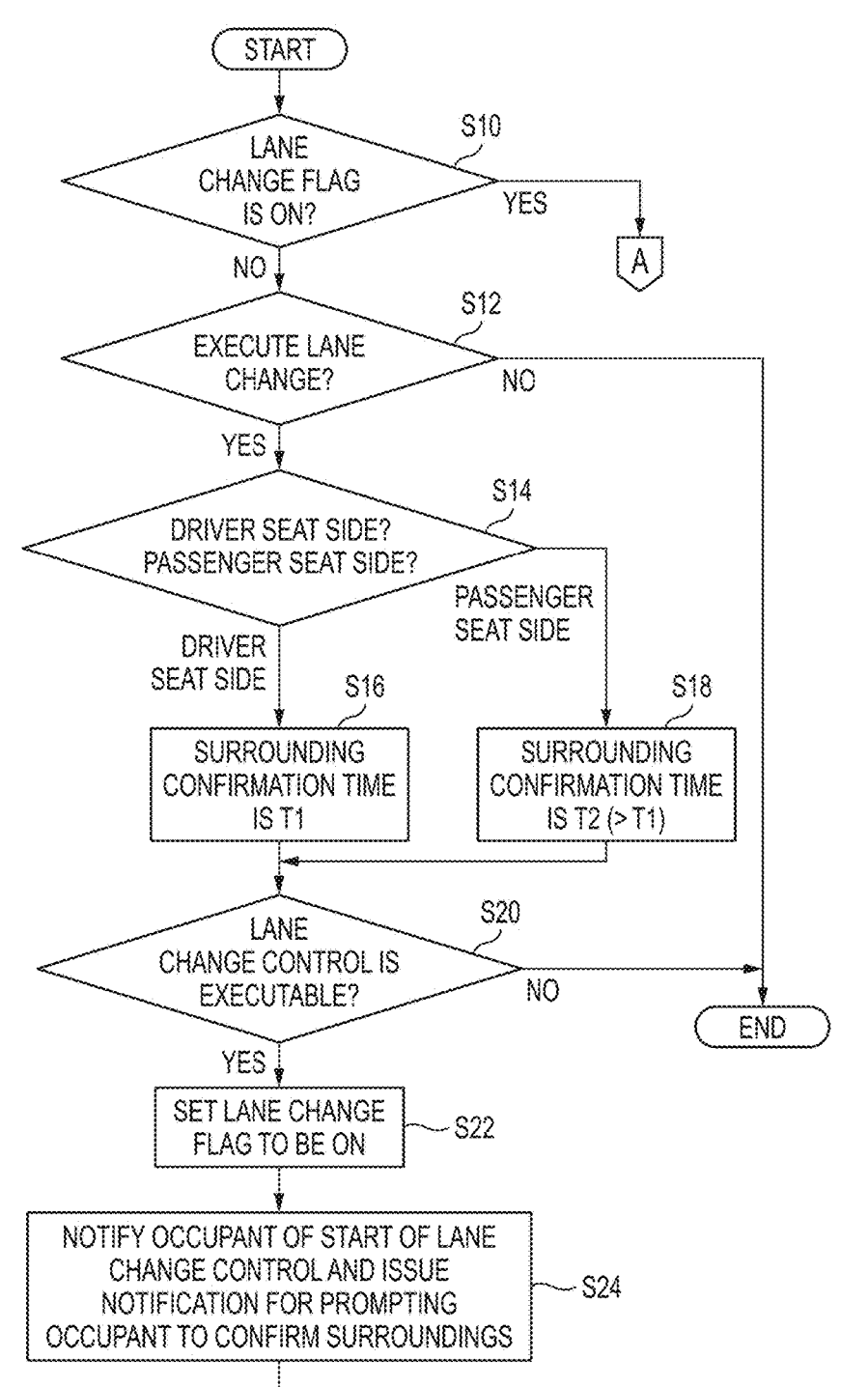
FIG. 5 is a flowchart showing an example of processing when the control device 100 executes lane change control.
Figure 6:
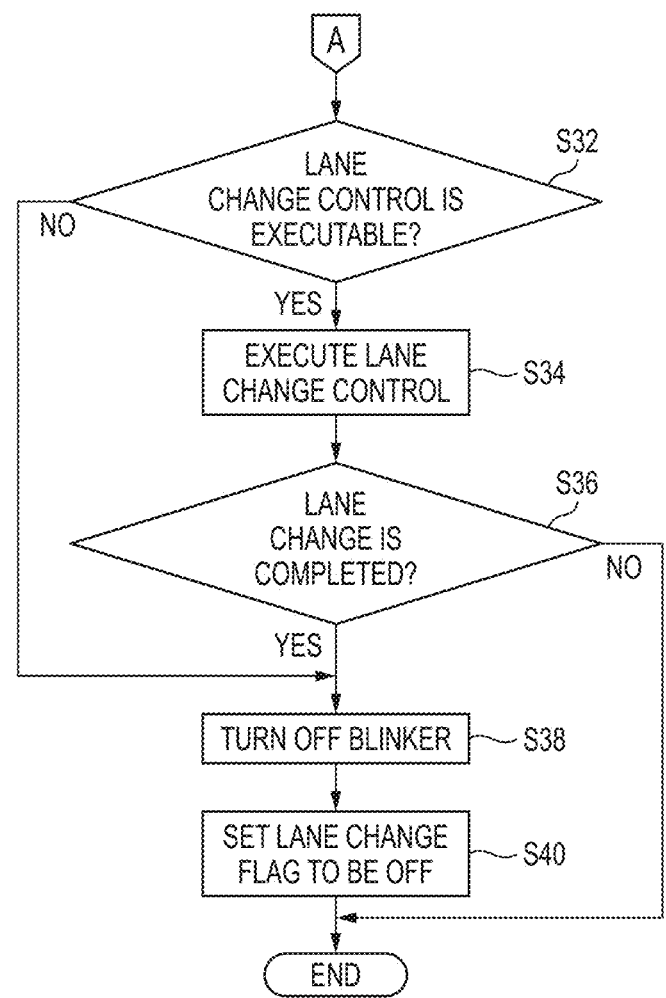
FIG. 6 is a continuation of the flowchart of FIG. 5.

Next, an example of a process (also referred to as a control flow) when the control device 100 executes the lane change control will be described with reference to flowcharts shown in FIGS. 5 and 6. In a state in which the vehicle 1 autonomously travels under the control of the control device 100, the control device 100 repeatedly executes, for example, the flowcharts of FIGS. 5 and 6 at a predetermined interval.

First, the control device 100 determines whether a lane change flag indicating an execution state of the lane change control is ON (step S10). When it is determined that the lane change flag is ON (step S10: YES), the control device 100 proceeds to processing of step S32 to be described later.

When it is determined that the lane change flag is OFF (step S10: NO), the control device 100 determines whether to execute the lane change (step S12). For example, the control device 100 determines to execute the lane change when the inter-vehicle distance between the vehicle 1 and the preceding vehicle M1 is equal to or less than a predetermined threshold value, but is not limited thereto, and may determine to execute the lane change when a predetermined condition is satisfied regardless of the presence or absence of the preceding vehicle M1.

When it is determined not to execute the lane change (step S12: NO), the control device 100 ends the current control flow as it is.

When it is determined to execute the lane change (step S12: YES), the control device 100 determines whether the direction of the lane change is the driver seat side or the passenger seat side (step S14).

In a case of the lane change to the driver seat side (step S14: driver seat side), the surrounding confirmation time is T1 (step S16). In a case of the lane change to the passenger seat side (step S14: passenger seat side), the surrounding confirmation time is T2 (>T1) (step S18). Specifically, the control device 100 sets the surrounding confirmation time to T1 or T2 by referring to the total time T1 of the time t10 and the time t20 and the total time T2 of the time t11 and the time t20, which are stored in advance in the control device 100.

Next, the control device 100 determines whether the lane change control is executable based on the surrounding situation recognized by the recognition unit 111 (step S20). Specifically, as described above, the control device 100 determines whether the lane change control is executable based on the surrounding situation including information on other vehicles present in the own lane L1 and the adjacent lane L2.

When determining whether the lane change control is executable, the control device 100 also considers the lane change time including the surrounding confirmation time determined in step S16 or step S18. Specifically, when it is determined that the lane change can be completed within the determined lane change time, the control device 100 determines that the lane change control is executable.

When it is determined that the lane change control is not executable (step S20: NO), the control device 100 ends the current control flow as it is.

When it is determined that the lane change control is executable (step S20: YES), the control device 100 sets the lane change flag to be ON (step S22).

When the lane change flag is set to ON, the control device 100 notifies, via the HMI 30, the occupant that the lane change control is to be executed (step S24). The control device 100 also issues a notification for promoting the driver to confirm the surroundings of the vehicle 1.

After the time t10 or t11 has elapsed from the start of the notification issued by the notification control unit 124, the control device 100 starts to turn on the blinker 5 (step S26).

Next, the control device 100 determines whether the driver can confirm the surroundings of the vehicle 1 within the surrounding confirmation time (step S28).

When it is determined that the driver cannot confirm the surroundings of the vehicle 1 within the surrounding confirmation time (step S28: NO), the control device 100 turns off the blinker 5 (step S29), sets the lane change flag to be OFF (step S30), and ends the current control flow as it is.

When it is determined that the driver can confirm the surroundings of the vehicle 1 within the surrounding confirmation time (step S28: YES), the control device 100 determines whether the lane change control is executable after the time t20 has elapsed from the start of turning on the blinker 5 (step S32).

When it is determined that the lane change control is not executable (step S32: NO), the control device 100 turns off the blinker 5 (step S38), sets the lane change flag to be OFF (step S40), and ends the current control flow. For example, when the preceding vehicle M1 changes the lane to the adjacent lane L2 after the blinker 5 is turned on, the control device 100 determines that the lane change control is not executable.

When it is determined that the lane change control is executable (step S32: YES), the control device 100 executes the lane change control (step S34). Accordingly, the control device 100 starts steering control of the vehicle 1, and the vehicle 1 moves laterally from the own lane L1 to the adjacent lane L2.

After the lane change control is started, the control device 100 determines whether the lane change is completed (step S36). Specifically, the control device 100 determines whether the vehicle 1 has moved laterally to the adjacent lane L2.

When it is determined that the lane change is not completed (step S36: NO), the control device 100 ends the current control flow as it is, and determines whether the lane change is completed in the control flow of a next time.

When the lane change is completed (step S36: YES), the control device 100 completes the lane change control. Then, the control device 100 turns off the blinker 5 (step S38), sets the lane change flag to be OFF (step S40), and ends the current control flow.

Surrounding Confirmation Time

The above-described surrounding confirmation time is T1 or T2 stored in advance in the control device 100, but is not limited thereto. The surrounding confirmation time changes based on at least one of the surrounding situation of the vehicle 1, a state of the occupant or a baggage in the vehicle 1, and specifications of the vehicle 1.

The surrounding situation of the vehicle 1 is, for example, information recognized by the recognition unit 111, and includes traffic information such as the number of other vehicles traveling around the vehicle 1, the number of lanes of the road 300 on which the vehicle 1 travels, and a curvature of the road 300. For example, when the number of other vehicles traveling around the vehicle 1 is large, when the number of lanes of the road 300 on which the vehicle 1 travels is large, or when the curvature of the road 300 is large, the visibility of the surroundings of the vehicle 1 is relatively poor, and thus the surrounding confirmation time may be set longer.

The surrounding situation of the vehicle 1 may include environment information such as backlighting, weather, and a time zone. For example, in a case of backlighting in which the sun is backlit from the direction of the lane change, in a case where fog is generated around the vehicle 1, or in a case where the time zone is night, the surrounding confirmation time may be set longer because the visibility of the surroundings of the vehicle 1 is relatively poor.

The state of the occupant or the baggage in the vehicle 1 includes, for example, boarding positions or the number of occupants other than the driver, and an arrangement or an amount of the baggage loaded on the vehicle 1. These states are detected by, for example, a camera (not shown) provided in a vehicle interior. For example, in a case where the occupant is seated in the passenger seat 3, in a case where the number of occupants in the vehicle 1 is large, or in a case where the loading amount of the baggage loaded on the vehicle 1 is large, the visibility of the surroundings of the vehicle 1 is relatively poor, and thus the surrounding confirmation time may be set longer.

Further, the state of the occupant in the vehicle 1 may also include information on a driving history of the driver. For example, in a case where the driving history of the driver is shorter, the surrounding confirmation time may be set longer.

The specifications of the vehicle 1 include, for example, information such as a vehicle width of the vehicle 1, a position of a seat of the vehicle 1 (for example, an inclination of the passenger seat 3), and an attachment state (for example, an angle state) of the side mirror 6. For example, in a case where the vehicle width of the vehicle 1 is large, in a case where the passenger seat 3 of the vehicle 1 is located at a position that blocks a field of view of the driver, or in a case where the side mirror 6 faces a relatively downward direction, the visibility of the surroundings of the vehicle 1 is relatively poor, and thus the surrounding confirmation time may be set longer.

Hereinafter, as a configuration in which the surrounding confirmation time changes based on at least one of the surrounding situation of the vehicle 1, the state of the occupant or the baggage in the vehicle 1, and the specifications of the vehicle 1, a configuration in which the surrounding confirmation time changes based on the surrounding situation of the vehicle 1 will be described as an example.

Figure 7:
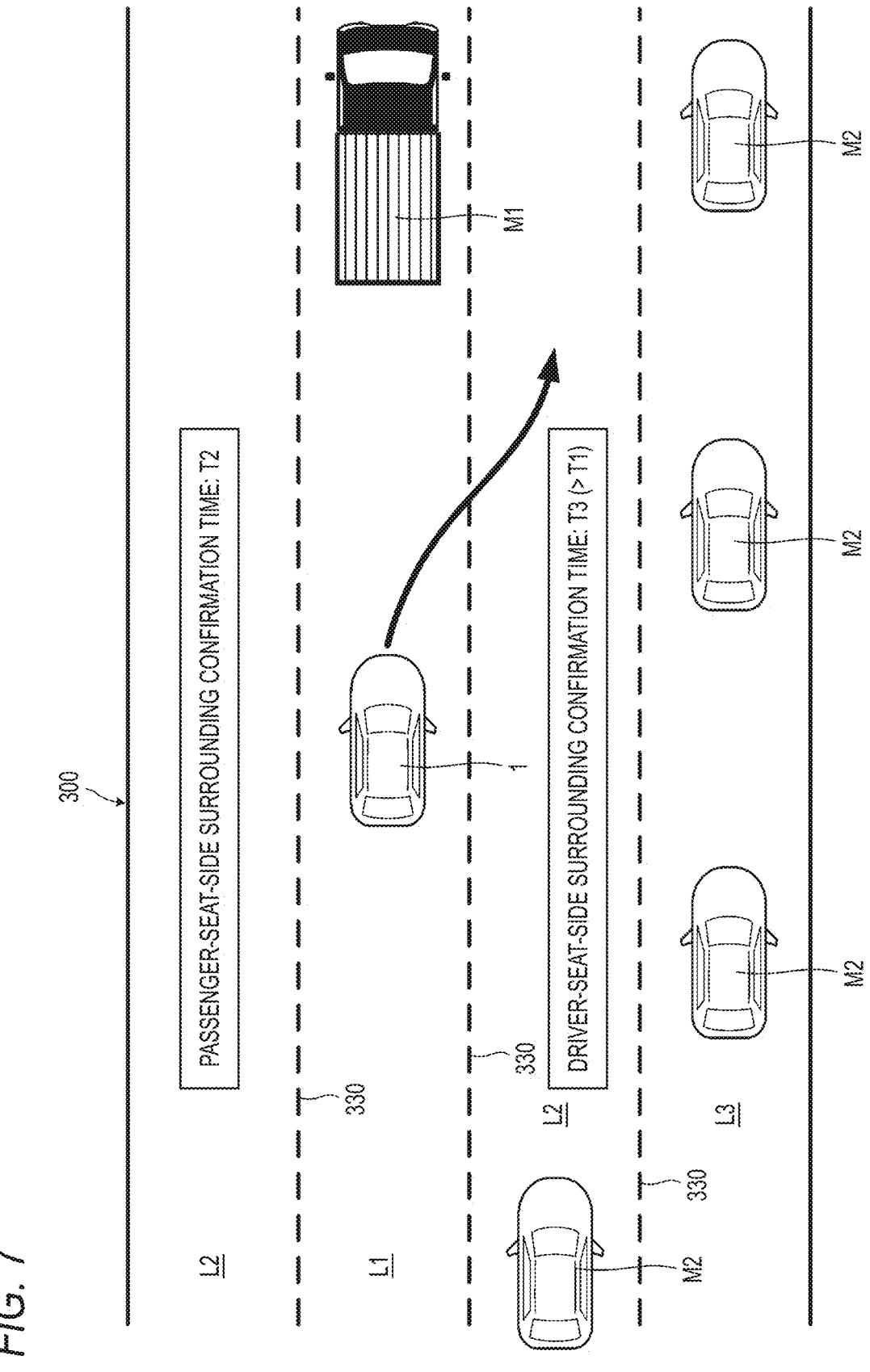
FIG. 7 shows an example of an operation in which the vehicle 1 changes the lane to the driver seat side when the number of other vehicles M2 traveling around the vehicle 1 on the driver seat side is large.

FIG. 7 shows an example of a lane change of the vehicle 1 to the adjacent lane L2 on the driver seat side in a case where the number of other vehicles M2 traveling around the vehicle 1 on the driver seat side is large (that is, a traffic volume is large).

In the example of FIG. 7, a lane L3 is further present on a right side of the adjacent lane L2 on the driver seat side of the vehicle 1, and many other vehicles M2 travel in the adjacent lane L2 and the lane L3.

The surrounding confirmation time may change based on the number of other vehicles M2 traveling around the vehicle 1. Specifically, the surrounding confirmation time in a case where the number of other vehicles M2 traveling around the vehicle 1 is large may be set longer than the surrounding confirmation time in a case where the number of other vehicles M2 traveling around the vehicle 1 is small.

In the example of FIG. 7, the control device 100 sets the driver-seat-side surrounding confirmation time to T3 (>T1) obtained by performing a correction of increasing T1 stored in advance. By setting the surrounding confirmation time longer in a case where the traffic volume is large, the driver may sufficiently confirm the surroundings on the driver seat side.

Here, the driver-seat-side surrounding confirmation time may be set longer than the passenger-seat-side surrounding confirmation time. That is, T3 that is newly set as the driver-seat-side surrounding confirmation time may be longer than T2 that is stored in advance as the passenger-seat-side surrounding confirmation time.

In a case where the number of other vehicles M2 traveling around the vehicle 1 on the passenger seat side is large, the passenger-seat-side surrounding confirmation time may be set to a corrected time obtained by increasing the T2 stored in advance.

Modification

In the above-described embodiment, on the assumption that the driver is seated in the driver seat 2, the passenger-seat-side surrounding confirmation time is set longer than the driver-seat-side surrounding confirmation time. However, for example, when the vehicle 1 autonomously travels by full automatic-driving, a case where no person is seated in the driver seat 2 at the time of executing the lane change control may be assumed.

Figure 8:
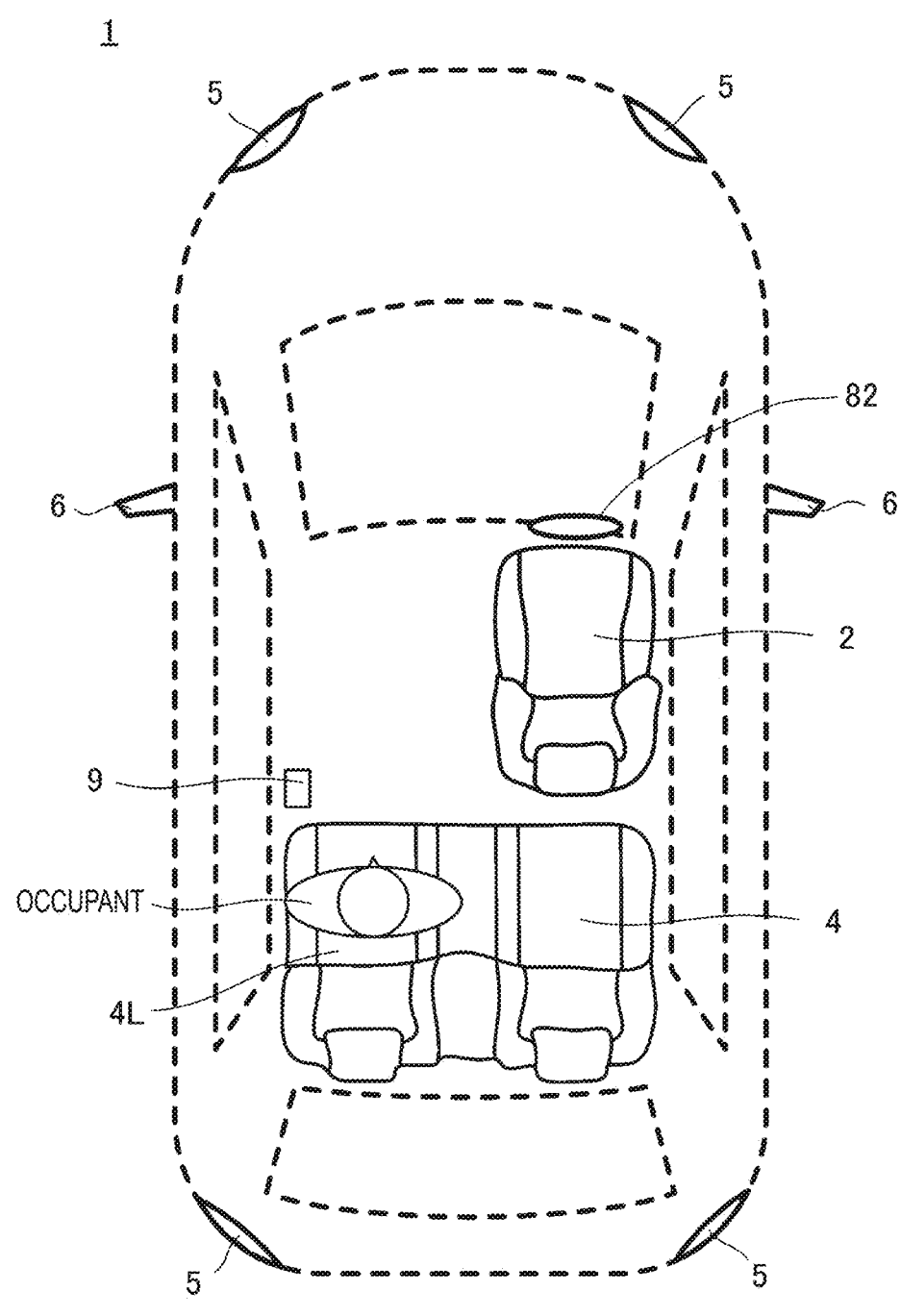
FIG. 8 is a schematic diagram of the vehicle 1 that autonomously travels by full automatic-driving in a state in which no occupant is seated in a driver seat 2.

FIG. 8 is a schematic diagram of the vehicle 1 that autonomously travels by full automatic-driving in a state in which no occupant is seated in the driver seat 2. The vehicle 1 shown in FIG. 8 is configured such that, for example, the occupant can move between the driver seat 2 and the rear seat 4 in the vehicle interior. In front of a left rear seat 4L of the rear seat 4, an operation unit 9 with which predetermined operations regarding the traveling of the vehicle can be performed 1 is provided. The occupant is seated in the left rear seat 4L and can perform, for example, an operation of cancelling the execution of the lane change control by operating the operation unit 9.

In such a case, when the occupant seated in the left rear seat 4L confirms the surroundings of the vehicle 1, the visibility on a side (right side) opposite to a riding side of the occupant is worse than the visibility on the riding side (left side) of the occupant. Therefore, in the modification, the surrounding confirmation time in a case of the lane change of the vehicle 1 to a direction (right direction) opposite to the riding side of the occupant under the lane change control is configured to be longer than the surrounding confirmation time in a case of the lane change to a direction (left direction) on the riding side of the occupant. For example, the control device 100 sets the surrounding confirmation time in the case of the lane change of the vehicle 1 to the right direction as T2, and sets the surrounding confirmation time in the case of the lane change to the left direction as T1. Accordingly, the surrounding confirmation time may be sufficiently ensured.

Then, for example, when it is determined that the occupant can confirm the surroundings within the surrounding confirmation time based on the detection result of the driver monitor camera 50 or the like, the control device 100 starts the lane change control. Further, the control device 100 may be configured to start the lane change control when it is determined that the occupant has confirmed the surroundings of the vehicle 1 based on the detection result of the driver monitor camera 50 or the like. When the occupant confirms the surroundings of the vehicle 1 and determines to cancel the lane change control, the occupant operates the operation unit 9 to cancel execution of the lane change control.

Although an embodiment and modifications of the present disclosure have been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, the components in the above embodiment may be freely combined without departing from the gist of the invention.

In the above-described embodiment, the passenger-seat-side surrounding confirmation time is set longer than the driver-seat-side surrounding confirmation time by setting the time t11 in the case of the lane change to the passenger seat side to be longer than the time t10 in the case of the lane change to the driver seat side, but the present disclosure is not limited thereto. For example, the passenger-seat-side surrounding confirmation time may be set longer than the driver-seat-side surrounding confirmation time by setting the time from the start of turning on the blinker 5 to the start of the lane change control in the case of the lane change to the passenger seat side to be longer than the time t20 in the case of the lane change to the driver seat side.

In the above-described embodiment, the time from the start notification of the lane change control to the start of the lane change control is set as the surrounding confirmation time, but the present disclosure is not limited thereto. For example, a time from the start of the notification issued by the notification control unit 124 to the start of the turning on the blinker 5 may be set as the surrounding confirmation time.

In the above-described embodiment, the driver-seat-side surrounding confirmation time and the passenger-seat-side surrounding confirmation time are respectively T1 and T2 stored in advance in the control device 100, but the present disclosure is not limited thereto, and may be configured to be variably set according to a wish of the occupant.

In this specification, at least the following matters are described. In parentheses, corresponding components and the like in the above embodiment are illustrated as an example, but the present invention is not limited thereto.

(1) A control device (control device 100) configured to execute lane change control of changing a lane in which a moving object (vehicle 1) travels, the control device including:

a recognition unit (recognition unit 111) configured to recognize at a surrounding situation of the moving object;

a lane change determination unit (lane change determination unit 113) configured to determine, based on the surrounding situation recognized by the recognition unit, whether the lane change control is executable;

a travel control unit (travel control unit 130) configured to execute the lane change control in response to the lane change determination unit determining that the lane change control is executable; and a notification control unit (notification control unit 124) configured to issue predetermined notification to an occupant of the moving object via a notification device (HMI 130, navigation HMI 62) mounted on the moving object, in which the notification control unit issues, to the occupant of the moving object, notification that the lane change control is to be started in response to the lane change determination unit determining that the lane change control is executable, the travel control unit starts the lane change control after a predetermined time elapses from when the notification control unit starts the notification that the lane change control is to be started, and the predetermined time differs depending on a lane change direction of the moving object under the lane change control.

When a surrounding confirmation time for the occupant to confirm the surroundings is uniform regardless of the direction of the lane change of the moving object, there is a concern that the surroundings confirmation of the occupant before a start of steering may be insufficient depending on the direction of the lane change. According to (1), the surrounding confirmation time may be sufficiently ensured regardless of the direction of the lane change because a timing of starting the lane change control varies depending on the direction of the lane change. Further, a decrease in an execution opportunity of the lane change may be prevented as compared with a case where the surrounding confirmation time is uniformly increased regardless of the direction of the lane change.

(2) The control device according to (1), in which the predetermined time when the lane of the moving object is changed to a first direction under the lane change control is longer than the predetermined time when the lane of the moving object is changed to a second direction under the lane change control, the first direction being one direction in a left-right direction and the second direction being the other direction in the left-right direction.

According to (2), the timing of starting the lane change control to any one of the left-right direction may be delayed, and a surrounding confirmation time may be sufficiently ensured.

(3) The control device according to (2), in which
visibility in the first direction when the occupant confirms surroundings of the moving object is worse than visibility in the second direction when the occupant confirms surroundings of the moving object.

According to (3), a timing of starting the lane change control to a direction with poor visibility may be delayed, and the surrounding confirmation time may be sufficiently ensured.

(4) The control device according to (3), in which
the first direction is a direction which is opposite to a side on which the occupant who is able to operate movement of the moving object gets in the left-right direction.

According to (4), since the visibility on direction of the lane change is relatively poor in a case of the lane change to the direction opposite to the riding side of the occupant who may operate a movement of the moving object, the timing of starting the lane change control is delayed as compared with a case of the lane change to the riding side, and thus the surrounding confirmation time may be sufficiently ensured.

(5) The control device according to (4), in which
the first direction is a direction which is opposite (passenger seat side) to a driver seat of the moving object in the left-right direction.

According to (5), since the visibility of the surroundings of the moving object is relatively poor in a case of the lane change to the direction opposite to a driver seat side, the timing of starting the lane change control is delayed as compared with a case of the lane change to the driver seat side, and thus the surrounding confirmation time may be sufficiently ensured.

(6) The control device according to any one of (1) to (5), in which
the predetermined time changes based on at least one of the surrounding situation, a state of the occupant or a baggage in the moving object, or specifications of the moving object.

According to (6), the surrounding confirmation time may be variably set based on the surrounding situation, the state of the occupant or the baggage in the moving object, and the specifications of the moving object.

(7) The control device according to any one of (1) to (5), in which
the travel control unit starts the lane change control in response to determination that the occupant is in a state of being able to confirm surroundings of the moving object within the predetermined time.

According to (7), since the lane change control is started in a state in which the occupant may confirm the surroundings of the moving object, safer lane change control may be executed.

(8) The control device according to any one of (1) to (5), in which
the predetermined time is a time from when the notification control unit starts the notification to when the lane change control is started, or a time from when the notification control unit starts the notification that the lane change control is to be started to when notification (blinking of blinker 5) of executing the lane change control to an outside of the moving object is started.

According to (8), the predetermined time may be appropriately determined.

(9) The control device according to any one of (1) to (5), in which
the predetermined notification issued by the notification control unit includes at least one of display using a display device (display device of HMI 30 and navigation HMI 62) mounted on the moving object and sound guidance using a sound output device (speaker of HMI 30 and navigation HMI 62) mounted on the moving object.

According to (9), the predetermined notification (for example, a start of that lane change control) may be provided to the occupant through display and/or a sound.

What is claimed is:

1. A control device configured to execute lane change control of changing a lane in which a moving object travels, the control device comprising:
a hardware processor configured to
recognize a surrounding situation of the moving object;
determine, based on the surrounding situation recognized by the hardware processor, whether the lane change control is executable;
execute the lane change control in response to the hardware processor determining that the lane change control is executable; and
issue predetermined notification to an occupant of the moving object via a notification device mounted on the moving object, wherein
the hardware processor issues, to the occupant of the moving object, notification that the lane change control is to be started in response to the hardware processor determining that the lane change control is executable,
the hardware processor starts the lane change control in response to the hardware processor determining that the lane change control is executable again after a predetermined time elapses from when the hardware processor starts the notification that the lane change control is to be started, and
the predetermined time differs depending on a lane change direction of the moving object under the lane change control.

2. The control device according to claim 1, wherein
the predetermined time when the lane of the moving object is changed to a first direction under the lane change control is longer than the predetermined time when the lane of the moving object is changed to a second direction under the lane change control, the first direction being one direction in a left-right direction and the second direction being another direction in the left-right direction.

3. The control device according to claim 2, wherein
visibility in the first direction when the occupant confirms surroundings of the moving object is worse than visibility in the second direction when the occupant confirms surroundings of the moving object.

4. The control device according to claim 3, wherein
the first direction is a direction which is opposite to a side on which the occupant who is able to operate movement of the moving object gets in the left-right direction.

5. The control device according to claim 4, wherein
the first direction is a direction which is opposite to a driver seat of the moving object in the left-right direction.

6. The control device according to claim 1, wherein
the predetermined time changes based on at least one of the surrounding situation, a state of the occupant or a baggage in the moving object, or specifications of the moving object.

7. The control device according to claim 1, wherein
the hardware processor starts the lane change control in
   response to determination that the occupant is in a state
   of being able to confirm surroundings of the moving
   object within the predetermined time.

8. The control device according to claim 1, wherein
the predetermined time is a time from when the hardware
   processor starts the notification to when the lane change
   control is started, or a time from when the hardware
   processor starts the notification that the lane change
   control is to be started to when notification of executing
   the lane change control to an outside of the moving
   object is started.

9. The control device according to claim 1, wherein
the predetermined notification issued by the hardware
   processor includes at least one of display using a
   display device mounted on the moving object and
   sound guidance using a sound output device mounted
   on the moving object.

* * * * *